Sept. 15, 1925. 1,553,792
A. REDLER
APPARATUS FOR CONVEYING AND ELEVATING GRANULAR OR OTHER MATERIAL
Filed Dec. 14, 1923
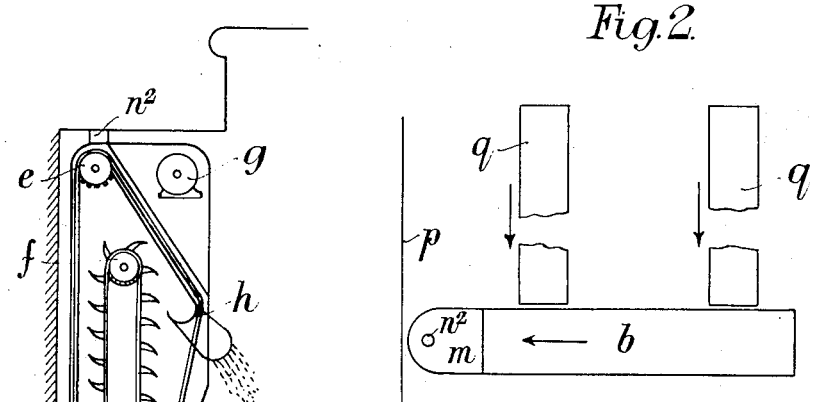
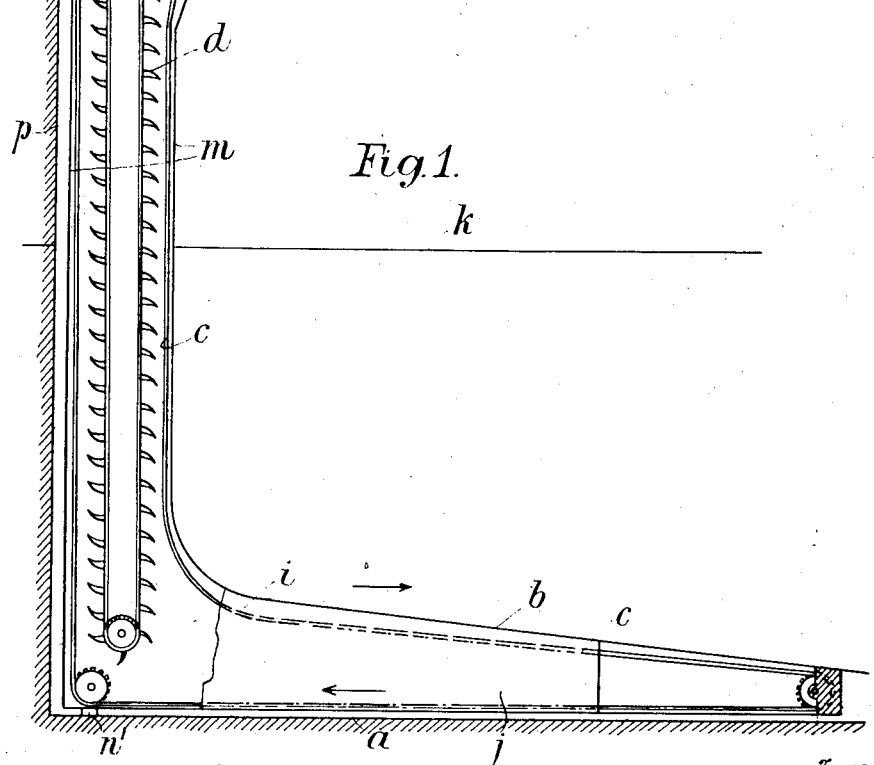
Inventor
ARNOLD REDLER,
Attorneys Patented Sept. 15, 1925.

1,553,792

UNITED STATES PATENT OFFICE.

ARNOLD REDLER, OF SHARPNESS, ENGLAND.

APPARATUS FOR CONVEYING AND ELEVATING GRANULAR OR OTHER MATERIAL.

Application filed December 14, 1923. Serial No. 680,613.

*To all whom it may concern:*

Be it known that I, ARNOLD REDLER, of Flour Mills, Sharpness, in the county of Gloucester, England, a subject of the King of Great Britain and Ireland, have invented certain new and useful Improvements in or Relating to Apparatus for Conveying and Elevating Granular or Other Material, of which the following is a specification.

This invention relates to apparatus for conveying and elevating granular, pulverulent material, broken stones, or other material from ships' holds, bins, and other places.

According to this invention, I provide a bucket or similar type elevator and an open chain conveyor, to convey the material to the bucket elevator to be raised, characterized in that the driving gear is above the surface of the material stored in bulk, so that it is free from any risk of clogging by the said material and is conveniently reachable at any time. This requires that the chain shall have an idle portion extending to the top of the hold or bin, although the only part which is conveying is that at the bottom of said hold or bin. The conveyor chain travels in a path outside the path of the bucket elevator, but is independent of the latter, its purpose being merely to feed it, the chain in its upward path being substantially parallel with the bucket elevator and clear therefrom, the under run of the chain and the vertical raiser constituting an L-shaped arrangement, the chain returning along any desired path, either along, or partly along the face or the back of the elevator, or at an inclination, or partly vertically or horizontally.

The elevator or conveyor may work in a casing or in the open, or partly enclosed or partly open.

The elevator and conveyor can be fixed in position or the elevator can be preferably mounted so as to turn about a vertical axis and permit the extension of the conveyor to sweep the deck or floor of the ship's hold or other place; or the elevator and conveyor may be made so that their position can be shifted, or tributary conveying chains may be utilized to cover the wider area of the floor, and collect the material for the conveyor instead of having to shift the position of the latter.

In one particular manner of carrying out my invention, the horizontal portion of the chain is mounted in an openwork casing or frame. The under run of the chain of the chain conveyor or bin discharger is continued around a jockey shaft beyond the bottom of the elevator, and rises perpendicularly outside the path of the elevator buckets to a sprocket wheel or the like above the top of the elevator. The said sprocket wheel returns the chain down outside the other path of the elevator buckets, until it reaches the openwork frame, where it passes along the upper track of the conveyor or bin discharger until the end sprocket wheel or the like over which it passes is reached, by which means the chain returns to the under run and so on, or it may return from the sprocket wheel at the top of the elevator to the end sprocket of the conveyor by devious paths, and if desired it may be utilized for one or more conveyors between these two points.

The power is transmitted to the elevator in the usual way, and is conveyed to the chain at any convenient point above the material stored in bulk when passing over a sprocket which can be used for that purpose.

The chain can travel uncovered through the material and outside the elevator, or in a separate trunk around the elevator, or in the elevator trunk in whichever way is desired, and the elevator can discharge through the chains or sideways in order to allow the chain to travel outside.

The chain can be tightened at any point by means of adjustable sprockets or guides, but in the arrangement shown in the figure, room is allowed for the weight of the chain to sag and tighten the latter at the junction of the conveyor to the elevator. The return chain will tend to free any choking at the foot of the elevator.

For soft materials, the conveyor can be opened on the top in the form of a bin discharger with or without increasing dimensions between the upper and lower runs.

For grain and granular materials, the top of the conveyor can be covered and the sides opened, which must be down to floor level if it is required to collect at floor level. When the conveyor is fixed in position, the size of the opening should preferably increase towards the delivery (or elevator) end, in order that the volume of material should be increased by added inflow as the conveyor travels along. Also it is preferable to allow increased dimensions between the upper and lower runs, towards the point of delivery, but when the elevator is pivoted and the conveyor allowed to sweep the floor or bin, the sides can be open and the upper and lower runs parallel.

Arrangements may be made for shifting the conveyor and elevator in position when one portion of the ship's hold or other place is empty, so as to cover a greater area of action.

The drawing filed herewith is a diagram of one form of apparatus, made in accordance with this invention.

Figure 1 is an elevation, and
Figure 2 is a plan view.

$a$ is the floor of a bin or bottom of the hold of a ship, $b$ is the openwork casing or frame. If covered, the cover is curved or ridged at the top to allow the material on it to flow off. $c$ is the conveyor chain, $d$ is the elevator, $e$ is the driving sprocket for the conveying chain, $f$ is the elevator drive, $g$ is a motor which may be housed in the casing of the elevator, $h$ is the delivery, which may be from either or both sides, or the delivery may take place through the links of the chain. The vertical portion of the chain and the elevator is contained in the casing $n$ which may be enclosed and which is provided with pivots $n'$ and $n^2$, by which it is rotatably supported by sides $p$ of the ship or of a bulwark. The material is carried by the conveyor chain to the elevator. The space between the bottom of the hold $a$ and the deck or roof $k$ may be full of wheat, and on starting the apparatus, the material will flow into the conveyor to be elevated. Tributary conveying chains $qq$ (Figure 2) may be used to feed the discharger.

What I claim and desire to secure by Letters Patent is:—

1. A ship discharger comprising an elevator of the bucket type and a chain conveyor acting separately, the chain conveying the material to the bucket elevator to be raised thereby, characterized in that the conveyor chain travels in a path outside the path of the bucket elevator, the chain which is idle and non-effective in its upward path being substantially parallel with the bucket elevator, the chain returning along any desired path.

2. A ship discharger as claimed in claim 1, mounted so as to turn about a vertical axis and permit the rotation of the conveyor to sweep the deck or floor of the ship's hold or other place.

3. A ship discharger as claimed in claim 1, in combination with tributary conveying chains utilized to cover the wider area of the floor, and collect the material for the conveyor instead of having to shift the position of the latter.

4. A ship discharger as claimed in claim 1, and a casing for said discharger.

5. A ship discharger as claimed in claim 1, the horizontal portion at least of which is an openwork frame or casing, the distance between the upper and lower runs increasing towards the delivery end in order that the volume of material should be increased by added inflow as the conveyor travels along for discharging grain and granular materials.

In testimony whereof, I affix my signature.
ARNOLD REDLER.